(12) United States Patent
Petronelli et al.

(10) Patent No.: US 9,198,008 B2
(45) Date of Patent: *Nov. 24, 2015

(54) SYSTEM AND METHOD FOR RELIABLE MOBILE COMMUNICATION IN AREAS WITH SPORADIC SIGNAL RECEPTION

(71) Applicant: AT&T Intellectual Property I, L.P., Atlanta, GA (US)

(72) Inventors: Anthony P. Petronelli, San Jose, CA (US); Canhui Ou, Danville, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/873,397

(22) Filed: Apr. 30, 2013

(65) Prior Publication Data

US 2013/0244703 A1 Sep. 19, 2013

Related U.S. Application Data

(63) Continuation of application No. 12/023,638, filed on Jan. 31, 2008, now Pat. No. 8,442,492.

(51) Int. Cl.
| | |
|---|---|
| *H04W 4/00* | (2009.01) |
| *H04W 4/12* | (2009.01) |
| *H04L 12/58* | (2006.01) |
| *H04M 3/533* | (2006.01) |

(52) U.S. Cl.
CPC ............. *H04W 4/12* (2013.01); *H04L 12/5855* (2013.01); *H04L 51/14* (2013.01); *H04M 3/53366* (2013.01); *H04L 12/5895* (2013.01); *H04M 2207/18* (2013.01)

(58) Field of Classification Search
CPC ............. H04W 4/00–4/008; H04W 8/00–8/16; H04W 40/00–40/38; H04W 60/00–60/06; H04W 74/00–74/008; H04W 88/00; H04M 3/533; H04M 1/65; H04M 3/42059
USPC ........... 455/412.1, 412.2, 413, 417–418, 466, 455/550.1, 567; 370/310.2, 328; 379/67.1, 379/85, 88.22
See application file for complete search history.

(56) References Cited

U.S. PATENT DOCUMENTS

| | | | |
|---|---|---|---|
| 5,491,741 | A | 2/1996 | Farwell et al. |
| 5,809,414 | A | 9/1998 | Coverdale et al. |
| 5,991,901 | A | 11/1999 | Mulford et al. |
| 6,018,655 | A | 1/2000 | Bartle et al. |
| 6,038,444 | A | 3/2000 | Schipper et al. |
| 6,049,723 | A | 4/2000 | Park |
| 6,088,589 | A | 7/2000 | Valentine et al. |
| 6,108,532 | A | 8/2000 | Matsuda et al. |
| 6,223,051 | B1 | 4/2001 | Rikihisa |
| 6,667,962 | B1 | 12/2003 | Lee et al. |
| 7,072,641 | B2 | 7/2006 | Satapathy |

(Continued)

*Primary Examiner* — Steve D Agosta
(74) *Attorney, Agent, or Firm* — Parks Wood LLC (57) ABSTRACT

A method of operating a cellular telephone comprises presenting a user with an option of a first rule or a second rule, and accepting a selection of the first rule or the second rule. The first rule relates to a voice message, and the second rule relates to a text message. The method determines that reception is not sufficient to establish communication, and stores an address of an intended recipient. The method also stores the voice message if the first rule was selected or the text message if the second rule was selected. When reception is sufficient to establish communication, the stored message is sent to the address.

13 Claims, 4 Drawing Sheets

(56) References Cited

U.S. PATENT DOCUMENTS

| | | |
|---|---|---|
| 7,239,881 B2 | 7/2007 | Lekutai |
| 7,298,833 B2 | 11/2007 | Klein et al. |
| 2004/0157606 A1 | 8/2004 | Lee |
| 2005/0048981 A1 | 3/2005 | Anupam et al. |
| 2005/0070286 A1 | 3/2005 | Awasthi et al. |
| 2005/0152515 A1 | 7/2005 | Amir et al. |
| 2007/0202844 A1 | 8/2007 | Wilson et al. |
| 2007/0218871 A1 | 9/2007 | Bonner |

SYSTEM AND METHOD FOR RELIABLE MOBILE COMMUNICATION IN AREAS WITH SPORADIC SIGNAL RECEPTION

FIELD OF THE DISCLOSURE

The present disclosure generally relates to telecommunications, and more particularly relates to signal reception in wireless communications.

BACKGROUND

The signal from cellular telephone base stations is not uniformly strong in all areas. In fact, some areas exist in which coverage is sporadic or non-existent. In these zones, users may need to monitor their cellular telephones for an indication that they are receiving a signal of sufficient strength before initiating a communication.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
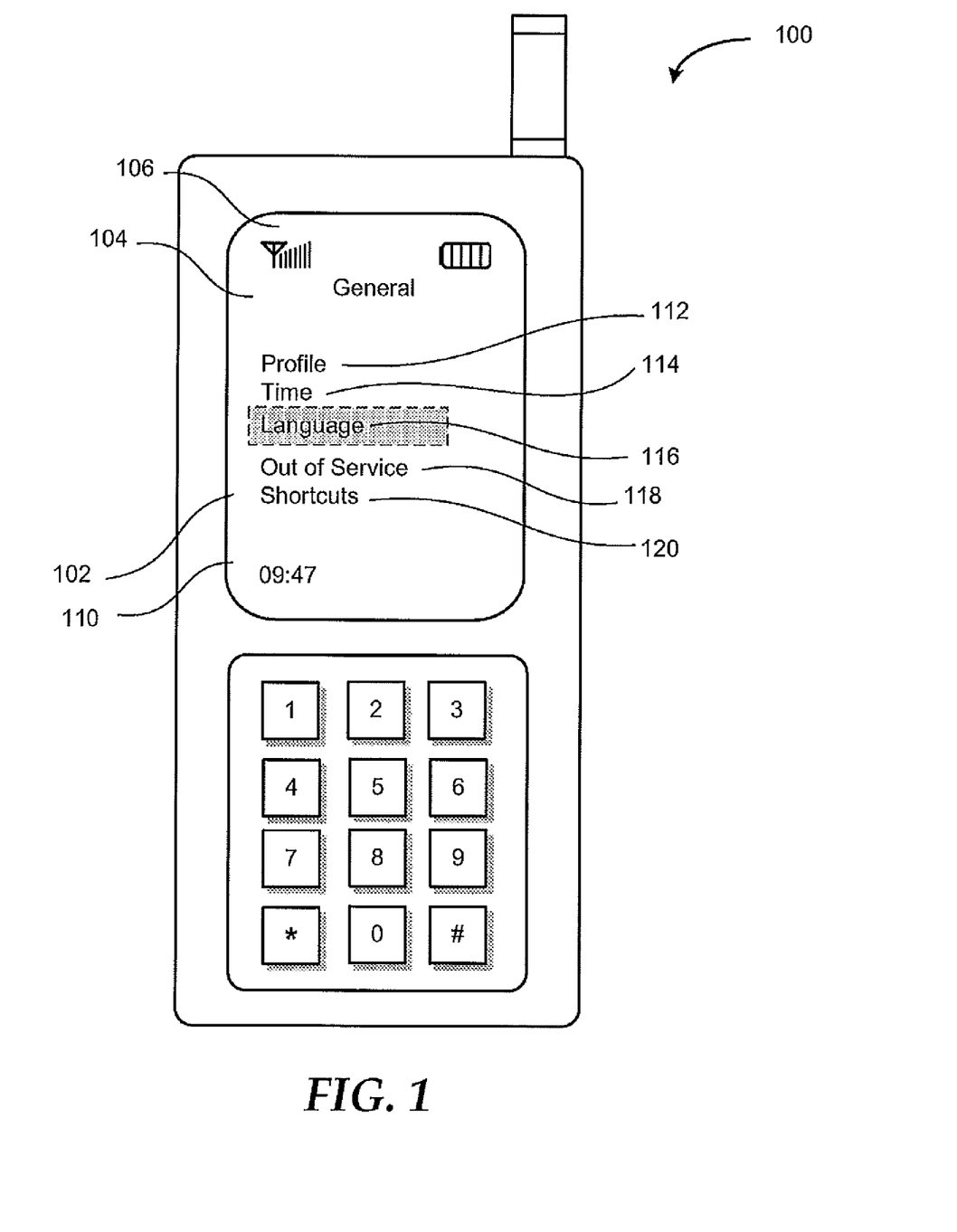
FIG. 1 shows a first, general user interface for a cellular telephone.

FIG. 1 shows a cellular telephone 100 having a screen 102 on which is displayed a user interface 104. The user interface 104 as shown may not be a default start screen, but in a preferred embodiment is a general screen for setting various options that may be accessed from the default screen. The user interface 104 preferably includes common icons such as those for signal strength 106, battery charge remaining 108, and time of day 110. In addition, the general user interface 104 includes selectable categories 112, 114, 116, 118 and 120 for respectively setting options associated with a user profile, the time, a language, out-of-service options, and shortcuts. By selecting the out-of-service option 118, the user may designate certain actions to take place whenever reception quality exceeds a threshold, such as when the signal strength falls to zero.

Figure 2:
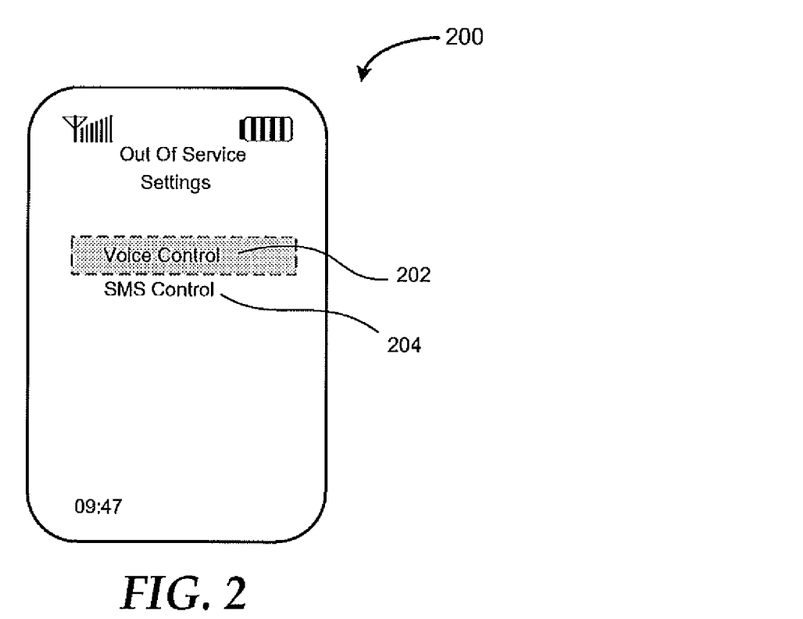
FIG. 2 shows a second, out-of-service user interface.

FIG. 2 shows a user interface 200 that is generated by the selection of the out-of-service option 118. The user interface 200 presents the user with options 202 and 204 for voice control and short messaging service (SMS) control, respectively.

Figure 3:
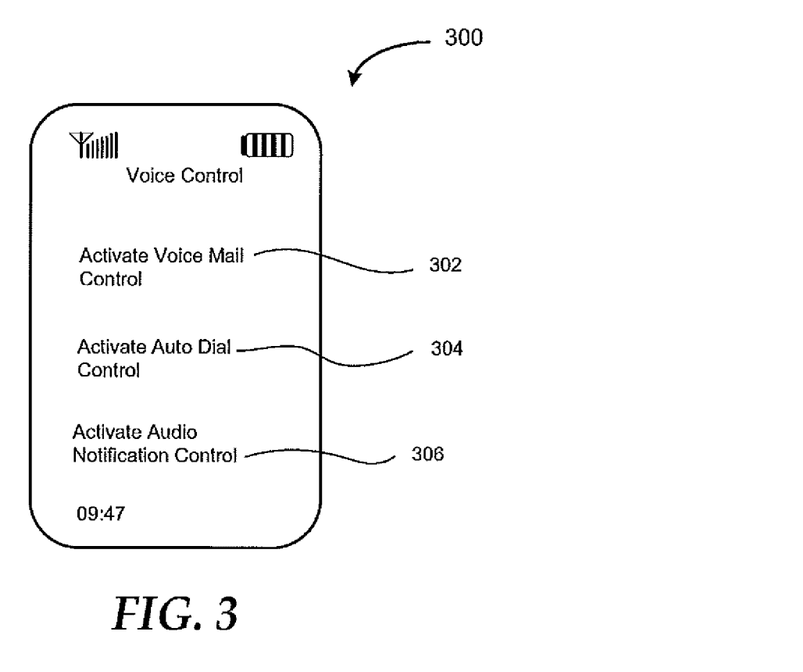
FIG. 3 shows a third, voice control user interface.

FIG. 3 shows a user interface 300 that is generated by the selection of the voice control option 202. The user interface 300 presents the user with respective options 302, 304 and 306 for activating voice mail control, activating automatic dialing control, and activating audio notification control. Activating voice mail control by selecting option 302 allows the user to record a voice message for a party that the user is trying to reach. The recorded voice message may be stored in a memory of the cellular telephone 100, and delivered when sufficient reception is reattained or at some preset or user determined interval thereafter. Activating automatic dial control by selecting option 304 allows the cellular telephone 100, upon resumption of sufficient reception, to dial a telephone number that may have been entered and stored while there was insufficient reception. The cellular telephone may thereafter inform the user via some sort of audible or visual indicator that a call is being made to the recipient. Activating audio notification control by selecting option 306 allows the cellular telephone 100 to inform the user that a signal is available, and to display a list of recipients the user tried to call while there was no signal.

Figure 4:
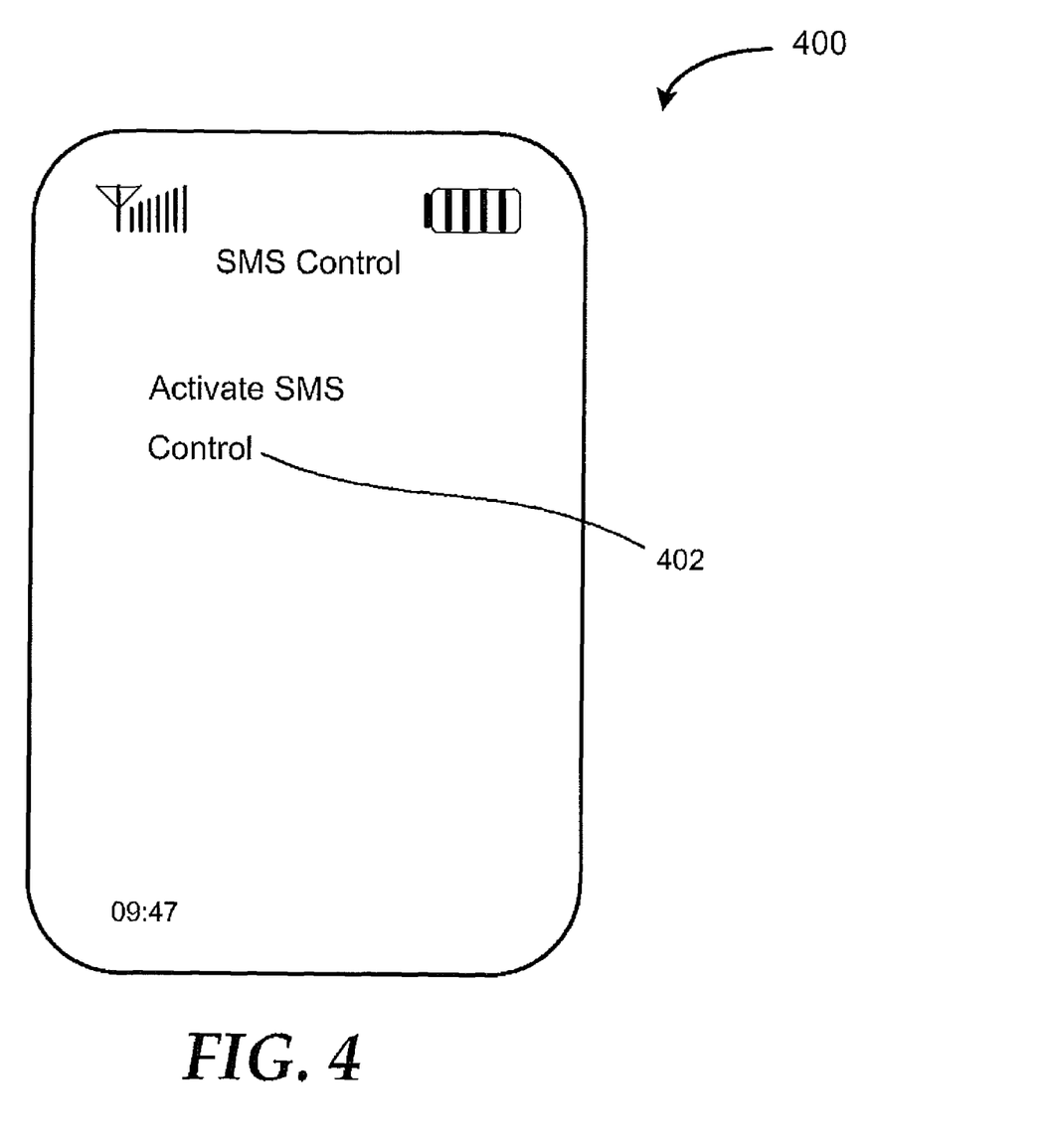
FIG. 4 shows a fourth, short messaging service (SMS) user interface.

FIG. 4 shows a user interface 400 that is generated by the selection of the SMS control option 204 shown in FIG. 2. The user interface 400 presents the user with an option 402 for activating SMS control. By selecting the option 402, the user may enter a text message for a party that the user is trying to reach. The text message may be stored in the cellular telephone memory, and then delivered when sufficient reception is reattained or at the preset or user determined interval thereafter.

Figure 5:
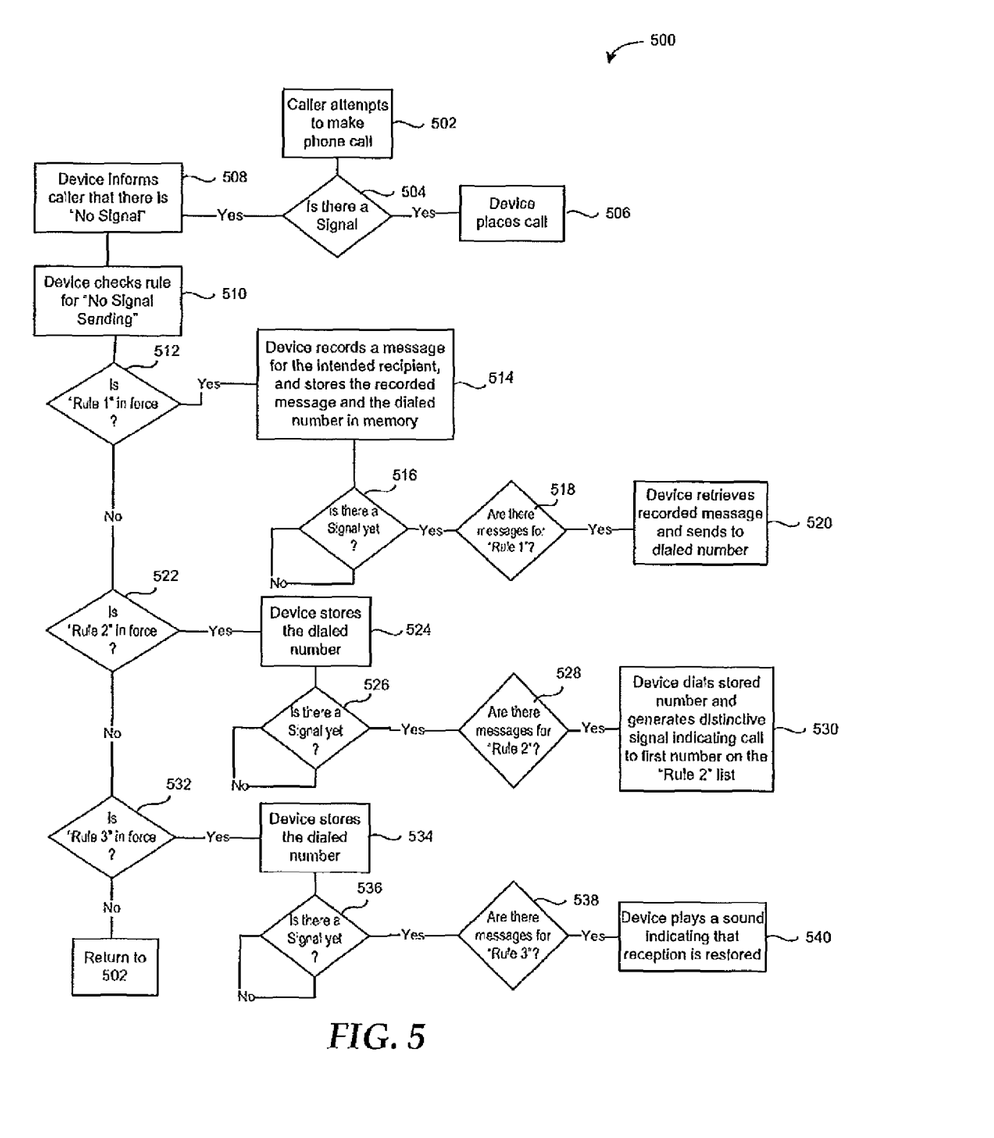
FIG. 5 shows a flow chart of a method for setting options for a cellular telephone in areas of sporadic reception.

FIG. 5 shows a flow chart of a method 500 for allowing a cellular telephone in an area with sporadic signal reception to automatically send, when reception is sufficient, a pre-recorded voicemail to one or multiple recipients, call a recipient, or send one or multiple pre-stored SMS text messages. At block 502, the caller attempts to place a cellular telephone call. The method determines at block 504 whether there is sufficient signal strength to initiate the call. If there is sufficient reception, the method at block 506 establishes normal communications with a local base station. If there is not sufficient reception, at block 508 the method may optionally inform the user that there is insufficient signal strength. The method then checks at block 510 whether a policy has been set for the insufficient signal condition. Thus, at block 512 the method determines whether a first rule, such as activating voice mail control, is in effect.

If the first rule is in effect, the method proceeds to block 514 where the cellular telephone allows the user to record a message for the intended recipient, and stores the recorded message and the telephone number of the intended recipient. At block 516, the method checks whether sufficient reception has been reestablished. If not, the method loops until sufficient reception is present. When that occurs, the method checks at block 518 whether there are any messages to be sent according to the first rule. Then at block 520, the method retrieves and sends any messages to the intended recipient.

If the first rule is not in effect at block 512, the method determines at block 522 whether a second rule, such as automatic dial control, is in effect. If so, the method proceeds to block 524 where the cellular telephone stores the dialed number. At block 526, the method checks whether sufficient reception has been reestablished. If not, the method loops until sufficient reception is present. When that occurs, the method checks at block 528 whether there are any actions to be taken according to the second rule, such as sending messages by automatic dialing. If so, the method at block 530 causes the hardware to dial any stored numbers, and optionally to send a distinctive signal to inform the caller that the second rule has been executed such as by automatically dialing a stored number and sending a message.

If the second rule is not in effect at block 522, the method determines at block 532 whether a third rule, such as audio notification control, is in effect. If so, the method proceeds to block 534 where the cellular telephone stores the dialed number. At block 536, the method checks whether sufficient reception has been reestablished. If not, the method loops until sufficient reception is present. When that occurs, the method checks at block 538 whether there are any actions to be taken according to the third rule, such as enabling audio notification. If so, the method at block 540 causes the hardware to play a distinctive sound informing the caller that sufficient reception has been restored.

The systems and methods described thus enable cellular telephone users in areas with sporadic reception to communicate more efficiently. The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A non-transitory computer-readable storage device, for use in a mobile communication device, comprising computer-executable instructions that, when executed by a processor of the mobile communication device, cause the processor to perform operations comprising:

receiving user input to initiate an intended wireless communication over a wireless communications network to an intended recipient using a telephone number associated with a device of the intended recipient;

determining, responsive to receiving the user input for initiating the intended wireless communication, if a wireless connection to the wireless communications network is, at a time that the user input is received, sufficient to initiate the intended wireless communication, wherein, if the wireless connection to the wireless communications network is not sufficient to initiate the intended wireless communication at the time the user input is received, the intended wireless communication is not initiated responsive to the user input;

providing, in response to determining that the wireless connection is not sufficient to initiate the intended wireless communication, each of:
  a communication advising that there is insufficient wireless connection to initiate the intended wireless communication; and
  an option to create a user message for sending to the intended recipient;

recording, in response to receiving a user selection of the option to create the user message, the user message;

storing the user message in a memory of the mobile communication device;

storing the telephone number of the intended recipient with the user message;

initiating, subsequent to recording the user message, in response to determining that the wireless connection to the wireless communications network is sufficient to initiate a first, actual, wireless communication to the intended recipient using the associated telephone number, the first actual wireless communication including the user message recorded, wherein the intended recipient is a first actual recipient;

receiving, while the wireless connection to the wireless communications network for communications with the mobile communication device is not sufficient, a user indication of a second actual recipient for receiving the user message; and wherein the operation of initiating the first actual wireless communication, including the user message, in response to determining that the wireless connection to the wireless communications network is sufficient comprises initiating the first actual wireless communication, including the user message, to the first actual recipient and the second actual recipient in response to determining that wireless connection to the wireless communications network is sufficient.

2. A non-transitory computer-readable storage device, for use in a mobile communication device, comprising computer-executable instructions that, when executed by a processor of the mobile communication device, cause the processor to perform operations comprising:

receiving user input to initiate an intended wireless communication over a wireless communications network to an intended recipient using a telephone number associated with a device of the intended recipient;

determining, responsive to receiving the user input for initiating the intended wireless communication, if a wireless connection to the wireless communications network is, at a time that the user input is received, sufficient to initiate the intended wireless communication, wherein, if the wireless connection to the wireless communications network is not sufficient to initiate the intended wireless communication at the time the user input is received, the intended communication is not initiated responsive to the input;

providing, in response to determining that the wireless connection is not sufficient to initiate the intended wireless communication, each of:
  a communication advising that there is insufficient wireless connection to initiate the intended wireless communication; and
  an option to create a user message for sending to the intended recipient;

recording, in response to receiving a user selection of the option to create the user message, the user message;

storing the user message in a memory of the mobile communication device;

storing the telephone number of the intended recipient with the user message; and initiating, subsequent to recording the user message, in response to determining that the wireless connection to the wireless communications network is sufficient to initiate a first, actual, wireless communication to the intended recipient using the associated telephone number, the first actual wireless communication including the user message recorded wherein the operation of initiating the first actual wireless communication, including the user message, in response to determining that the wireless connection to the wireless communications network is sufficient comprises:
  initiating the first actual wireless communication in response to determining that a pre-determined period of time has elapsed since it was determined that the wireless connection to the wireless communications network is sufficient for initiating the first actual wireless communication.

3. The non-transitory computer-readable storage device of claim 2, wherein the intended wireless communication is a call; and
  wherein the operation of receiving the user input comprises receiving a request for initiating a call to the intended recipient.

4. The non-transitory computer-readable storage device of claim 2, wherein the intended wireless communication is a short message system message; and
  wherein the operation of receiving the user input comprises receiving user input including:
    text for a short message system message; and
    input requesting sending of the short message system message, including the text, to the intended recipient.

5. The non-transitory computer-readable storage device of claim 2, wherein:
  the pre-determined period of time is established by an originating user of the mobile communication device; and
  the operation of initiating the first actual wireless communication in response to determining that the pre-determined period of time has elapsed since it was determined that wireless connection to the wireless communications network is sufficient for initiating the first actual wireless communication comprises:
    initiating the first actual wireless communication in response to determining that the pre-determined period of time, established by the originating user, has elapsed since it was determined that the wireless connection to the wireless communications network is sufficient for initiating the first actual wireless communication.

6. A non-transitory computer-readable storage device, for use in a mobile communication device, comprising computer-executable instructions that, when executed by a processor of the mobile communication device, cause the processor to perform operations comprising:
  receiving user input to initiate an intended wireless communication over a wireless communications network to an intended recipient using a telephone number associated with a device of the intended recipient;
  determining, responsive to receiving the user input for initiating the intended wireless communication, if a wireless connection to the wireless communications network is, at a time that the user input is received, sufficient to initiate the intended wireless communication, wherein, if the wireless connection to the wireless communications network is not sufficient to initiate the intended wireless communication at the time the user input is received, the intended communication is not initiated responsive to the input;
  providing, in response to determining that the wireless connection is not sufficient to initiate the intended wireless communication, each of:
    a communication advising that there is insufficient wireless connection to initiate the intended wireless communication; and
    an option to create a user message for sending to the intended recipient;
  recording, in response to receiving a user selection of the option to create the user message, the user message, wherein the user message is a first short message service message including first text;
  storing the first short message service message in a memory of the mobile communication device;
  storing the telephone number of the intended recipient with the first short message service message;
  recording a second short message service message, including second text differing from the first text; and
  initiating transmission of the second short message service message from the mobile communication device to a receiver by way of the wireless communications network in response to determining that the wireless connection to the wireless communication network is sufficient.

7. The non-transitory computer-readable storage device of claim 6, wherein: the receiver is the intended recipient; and the operations further comprise communicating the first short message service message and the second short message service message to the intended recipient in response to determining that the wireless connection to the wireless communications network is sufficient.

8. A mobile communications device, comprising:
  a processor; and
  a computer-readable storage medium comprising computer-executable instructions that, when executed by the processor, cause the processor to perform operations comprising:
    receiving user input to initiate an intended wireless communication over a wireless communications network to an intended recipient using a telephone number associated with a device of the intended recipient;
    determining, responsive to receiving the user input to initiate the intended wireless communication, if a wireless connection to the wireless communications network is, at a time the user input is received, sufficient to initiate the intended wireless communication, wherein, if the wireless connection to the wireless communications network is not sufficient to initiate the intended wireless communication at the time the user input is received, the intended communication is not initiated;

providing, in response to determining that the wireless connection is not sufficient for initiating the intended wireless communication, each of:
- a communication advising that there is insufficient wireless connection to initiate the intended wireless communication; and
- an option to create a user message for sending to the intended recipient;

recording, in response to a user selection of the option to create the user message, the user message;

storing the user message in a memory of the mobile communications device; and storing the telephone number of the intended recipient with the user message;

initiating, subsequent to recording the user message, in response to determining that the wireless connection to the wireless communications network is sufficient to initiate a first, actual, wireless communication to the intended recipient using the associated telephone number, the first actual wireless communication including the user message recorded, wherein the intended recipient is a first actual recipient;

receiving, while there is insufficient wireless connection to the wireless communications network for communications with the mobile communication device, a user indication of a second actual recipient for receiving the user message; and wherein the operation of initiating the first actual wireless communication, including the user message, in response to determining that the wireless connection to the wireless communications network is sufficient comprises:
- initiating the first actual wireless communication, including the user message, to the first actual recipient and the second actual recipient in response to determining that the wireless connection to the wireless communications network is sufficient.

9. A mobile communications device, comprising:
a processor; and
a computer-readable storage medium comprising computer-executable instructions that, when executed by the processor, cause the processor to perform operations comprising:
receiving user input to initiate an intended wireless communication over a wireless communications network to an intended recipient using a telephone number associated with a device of the intended recipient;

determining, responsive to receiving the user input to initiate the intended wireless communication, if a wireless connection to the wireless communications network is, at a time the user input is received, sufficient to initiate the intended wireless communication, wherein, if the wireless connection to the wireless communications network is not sufficient to initiate the intended wireless communication at the time the user input is received, the intended communication is not initiated;

providing, in response to determining that the wireless connection is not sufficient for initiating the intended wireless communication, each of:
- a communication advising that there is insufficient wireless connection to initiate the intended wireless communication; and
- an option to create a user message for sending to the intended recipient;

recording, in response to a user selection of the option to create the user message, the user message;

storing the user message in a memory of the mobile device;

storing the telephone number of the intended recipient with the user message;

initiating, subsequent to recording the user message, in response to determining that the wireless connection to the wireless communications network is sufficient to initiate a first, actual, wireless communication to the intended recipient using the associated telephone number, the first actual wireless communication including the user message recorded; and wherein the operation of initiating the first actual wireless communication, including the user message, in response to determining that the wireless connection to the wireless communications network is sufficient comprises:
- initiating the first actual wireless communication in response to determining that a pre-determined period of time has elapsed since it was determined that the wireless connection to the wireless communications network is sufficient to initiate the first actual wireless communication.

10. A mobile communications device, comprising:
a processor; and
a computer-readable storage medium comprising computer-executable instructions that, when executed by the processor, cause the processor to perform operations comprising:
receiving user input to initiate an intended wireless communication over a wireless communications network to an intended recipient using a telephone number associated with a device of the intended recipient;

determining, responsive to receiving the user input to initiate the intended wireless communication, if a wireless connection to the wireless communications network is, at a time the user input is received, sufficient to initiate the intended wireless communication, wherein, if the wireless connection to the wireless communications network is not sufficient to initiate the intended wireless communication at the time the user input is received, the intended communication is not initiated;

providing, in response to determining that the wireless connection is not sufficient for initiating the intended wireless communication, each of:
- a communication advising that there is insufficient wireless connection to initiate the intended wireless communication; and
- an option to create a user message for sending to the intended recipient;

recording, in response to a user selection of the option to create the user message, the user message, wherein the user message is a first short message service message including first text;

storing the first short message service message in a memory of the mobile device;

storing the telephone number of the intended recipient with the user message;

recording a second short message service message, including second text differing from the first text; and initiating transmission of the second short message service message from the mobile communication device to a receiver by way of the wireless communications network in response to determining that the wireless connection to the wireless communication network is sufficient to initiate the transmission of the first short message service message and the second short message service message.

11. The mobile communications device of claim 10, wherein:
the receiver is the intended recipient; and
the operations further comprise communicating the first short message service message and the second short message service message to the intended recipient in response to determining that the wireless connection to the wireless communications network is sufficient to initiate the communication of the first short message service message and the second short message service message.

12. A method, comprising:
receiving, by a system using a processor, user input to initiate an intended wireless communication over a wireless communications network to an intended recipient using a telephone number;
determining, by the system, responsive to receiving the user input to initiate the intended wireless communication if a wireless connection to the wireless communications network is, at a time the user input is received, sufficient to initiate the intended wireless communication,
wherein, if the wireless connection to the wireless communications network is not sufficient to initiate the intended wireless communication at the time the user input is received, the intended wireless communication is not initiated;
providing, by the system, in response to determining that the wireless connection is not sufficient to initiate the intended wireless communication, each of:
a communication advising that there is insufficient wireless connection to initiate the intended wireless communication; and
an option to create a user message for sending to the intended recipient;
recording, by the system, in response to a user selection of the option to create the user message, the user message;
storing, by the system, the user message in a memory of the system;
storing, by the system, a telephone number of the intended recipient with the user message
initiating, in response to determining that the wireless connection to the wireless communications network is sufficient to initiate communication of a first actual wireless communication, the first actual wireless communication, including the user message recorded, to the intended recipient, wherein the intended recipient is a first actual recipient; the method further comprises
receiving, while the wireless connection to the wireless communications network is not sufficient to initiate the first actual wireless communication, a user indication of a second actual recipient for receiving the user message; and
initiating the first actual wireless communication, including the user message, in response to determining that the wireless connection to the wireless communications network is sufficient to initiate the first actual wireless communication, including the user message, to the first actual recipient and the second actual recipient.

13. A method, comprising:
receiving, by a system using a processor, user input to initiate an intended wireless communication over a wireless communications network to an intended recipient using a telephone number;
determining, by the system, responsive to receiving the user input to initiate the intended wireless communication if a wireless connection to the wireless communications network is, at a time the user input is received, sufficient to initiate the intended wireless communication,
wherein, if the wireless connection to the wireless communications network is not sufficient to initiate the intended wireless communication at the time the user input is received, the intended wireless communication is not initiated;
providing, by the system, in response to determining that the wireless connection is not sufficient to initiate the intended wireless communication, each of:
a communication advising that there is insufficient wireless connection to initiate the intended wireless communication; and
an option to create a user message for sending to the intended recipient;
recording, by the system, in response to a user selection of the option to create the user message, the user message;
storing, by the system, the user message in a memory of the system; and
storing, by the system, a telephone number of the intended recipient with the user message; and
initiating a first actual wireless communication, including the user message, in response to determining that the wireless connection to the wireless communications network is sufficient to initiate the first actual wireless communication, wherein initiating the first actual wireless communication comprises initiating the first actual wireless communication in response to determining that a pre-determined period of time has elapsed since it was determined that the wireless connection to the wireless communications network is sufficient to initiate the first actual wireless communication.

* * * * *